United States Patent
Whittaker

[11] 4,185,326
[45] Jan. 22, 1980

[54] MINEHUNTING VEHICLE WITH A BUILT-IN SEARCH PATTERN

[75] Inventor: Clyde A. Whittaker, Panama City, Fla.

[73] Assignee: The United States of America as represented by the Secretary of the Navy, Washington, D.C.

[21] Appl. No.: 11,107

[22] Filed: Feb. 25, 1960

[51] Int. Cl.² .............................................. G01S 9/66
[52] U.S. Cl. ...................................... 367/96; 114/23; 114/25
[58] Field of Search .................. 114/21.1, 21.2, 20, 114/23, 25, 20 R; 340/3 R Primary Examiner—Richard A. Farley
Attorney, Agent, or Firm—Louis A. Miller; Rolla N. Carter

EXEMPLARY CLAIM

1. In a self-propelled elongated underwater vehicle having a rudder and diving fins adapted to execute a search pattern about an acoustic marker on the ocean floor and adapted to release an explosive charge carried thereby under the control of a mine sensing device, the combination of right and left bow hydrophones having substantially the same directivity patterns and located symmetrically with respect to the vertical plane defined by the longitudinal axis of said vehicle, an output circuit for each of said hydrophones, a servomechanism for adjusting the rudder, means for comparing the signals in said output circuits and correspondingly powering the rudder servomechanism, a gate circuit connected to be in closed condition only when a signal is present in either of said output circuits, a voltage source connected through said gate circuit to said servomechanism and operable to adjust said rudder to full rudder position in a direction corresponding to the polarity chosen for said voltage source, means for developing a control signal in accordance with the departure of the vehicle from a selected distance above the ocean floor, and means responsive to said control signal and adapted for operating said diving fins.

5 Claims, 5 Drawing Figures

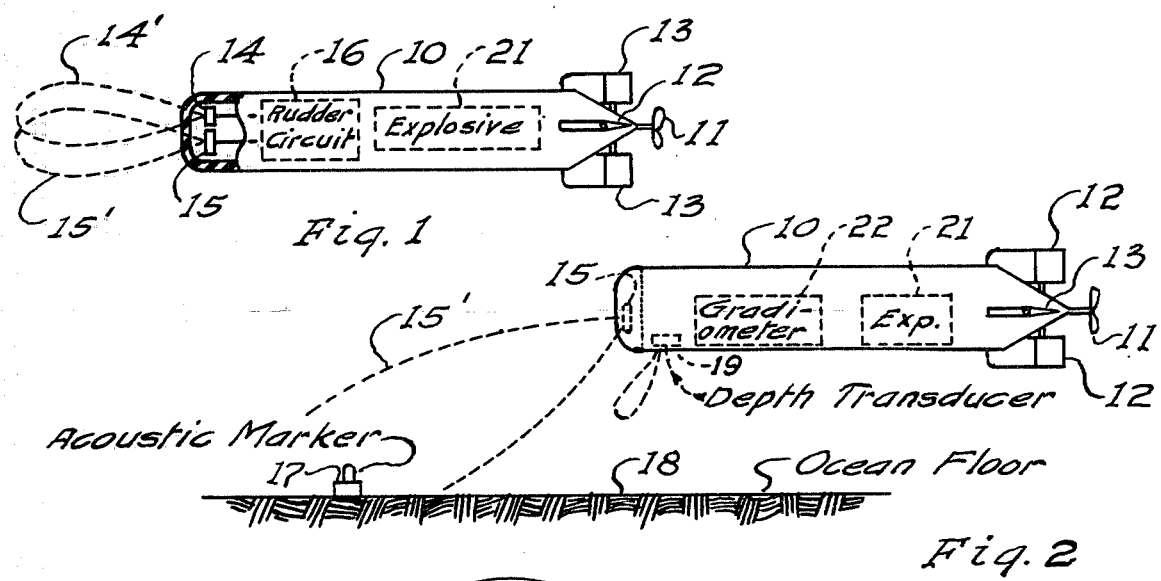
Fig. 1
Fig. 2
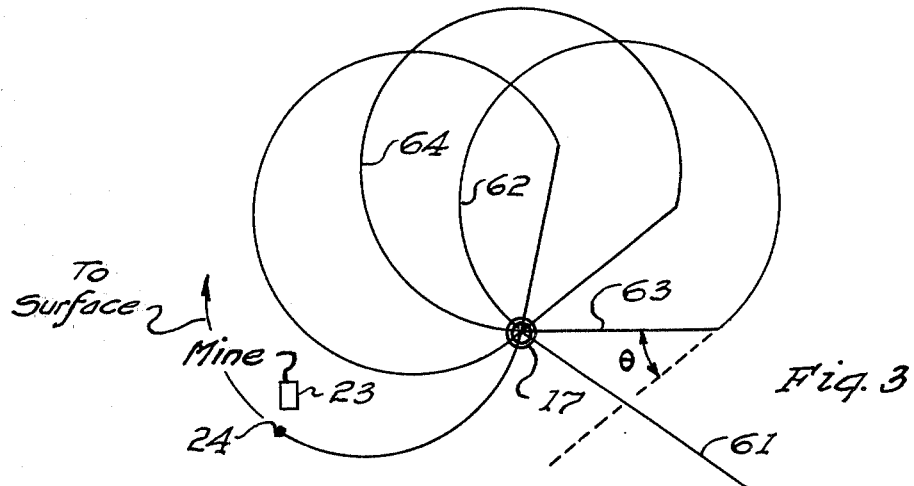
Fig. 3
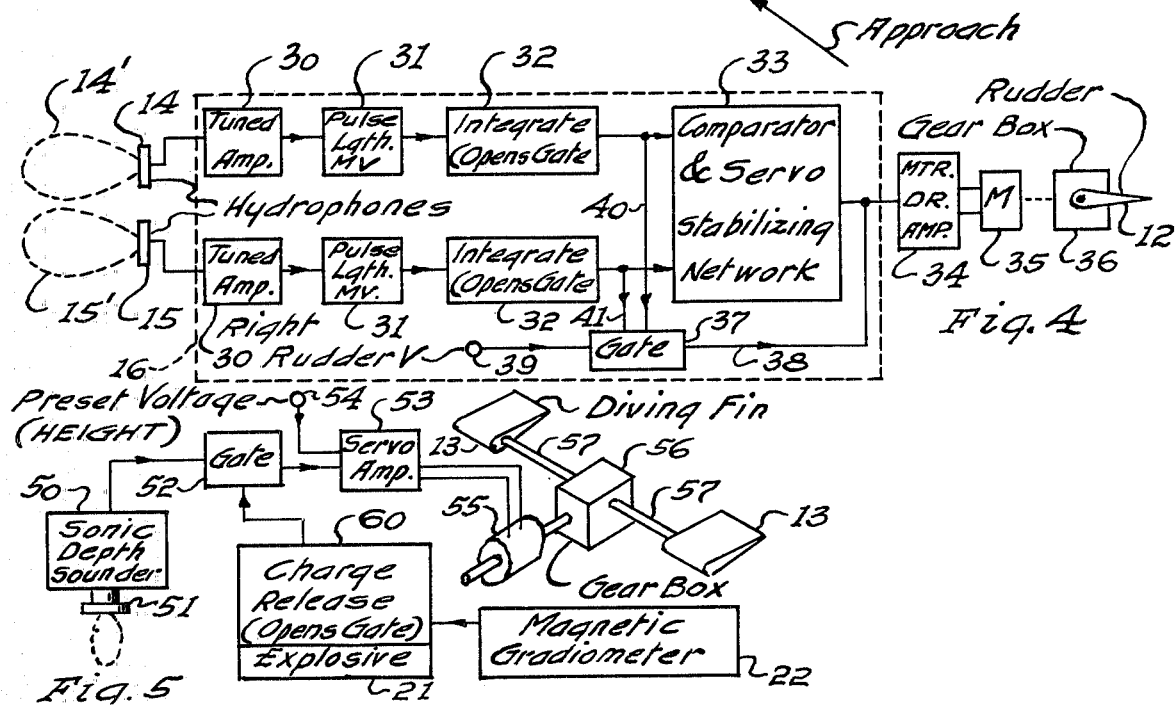
Fig. 4
Fig. 5

MINEHUNTING VEHICLE WITH A BUILT-IN SEARCH PATTERN

The invention described herein may be manufactured and used by or for the Government of the United States of America for governmental purposes without the payment of any royalties thereon or therefor.

The present invention relates to the destruction of a ground mine whose presence has been detected and whose approximate location has been marked by a device which emits acoustic energy and more particularly to an automobile underwater vehicle which will systematically search a bottom area centered on the acoustic marker and deposit an explosive charge near a mine sensed in such area, the probable error in the placing of the acoustic marker being greater than the destructive radius of the charge to be deposited.

Underwater swimmers are presently employed to place an explosive charge on a mine, the approximate position of which has been detected by known means such as a searching sonar system. This procedure is not only quite perilous for the swimmer but is time consuming and requires an excessive number of swimmers for a prolonged minehunting operation, e.g., in 60 foot water a swimmer is limited to four descents a day. Systems exist in the minehunting art for detecting a mine-like object and depositing in the vicinity of the detected object an explosive charge or a marker which radiates energy into the water such as the acoustic marker above referred to. Such charge or marker is deposited with a comparatively large probable error, i.e., in excess of 20 feet, thereby requiring a very large charge to assure destruction of the mine since the destructive capability of a charge decreases approximately as the square of its distance from the mine. Stated conversely, the size of a charge required to destroy a mine increases approximately as the square of its distance from the mine.

The present invention is directed to an arrangement or system which avoids both the use of swimmers and of outsized explosive charges by depositing an acoustic marker near a mine with the same large probable error and then utilizing this marker as a reference point for controlling the search pattern of a minehunting vehicle which at close range releases an explosive charge with considerable accuracy quite close to any mine detected during its search.

Accordingly, it is an object of the present invention to provide an automobile underwater mine detecting vehicle which will seek and thereafter systematically search an area surrounding an acoustic marker positioned on or adjacent the ocean floor.

It is also an object of the invention to provide an underwater vehicle which will upon detecting a mine, release an explosive charge and thereafter automatically surface to be recovered for further use.

The foregoing and other objects are accomplished in accordance with the preferred embodiment of the invention by the provision of a self-propelled underwater vehicle having a catacoustic system for seeking and maintaining the vehicle a fixed height above the bottom, a passive acoustic guidance system for homing on an acoustic marker and thereafter executing a search pattern about such marker, and a magnetic gradiometer for controlling the release of an explosive charge when a mine is detected.

Other objects and advantages of the invention will become apparent from the following description of a preferred embodiment when read in connection with the accompanying drawing in which:

FIGS. 1 and 2 are diagrammatic top and side views, respectively, illustrating the several component parts comprising a search vehicle incorporating the present invention;

FIG. 3 is a diagram showing the search pattern of the preferred embodiment of the invention;

FIG. 4 is a schematic diagram of rudder control apparatus for searching and homing; and FIG. 5 shows schematically in block diagram diving and charge release control apparatus.

As illustrated in FIGS. 1 and 2, an elongated torpedo-like hull 10 has a propeller 11, rudders 12 and diving fins 13 for driving and guiding the vehicle 10 under water. This vehicle 10 is provided with two bow hydrophones 14 and 15 having, respectively, directivity patterns 14' and 15' which overlap and are directed forwardly and downwardly for controlling through a rudder circuit 16 the rudders 12 to maintain substantially equal the outputs of the hydrophones 14 and 15 so that in the manner of a passive homing torpedo, the vehicle 10 will guide itself towards a source of acoustic energy of the proper frequency such as an acoustic marker 17 which preferably pings several times a second. In the absence of an output from both the hydrophones 14 and 15 the control circuit 16 functions to set full rudder to port or starboard as preselected. The vehicle 10 is also provided with means for controlling the diving fins 13 in such a manner that the vehicle 10 seeks and automatically maintains itself a preselected height above the ocean floor 18. The preferred embodiment illustrated utilizes for this height-above-the-bottom control a sonic fathometer including a transducer 19 which through a servo system, such as that to be described in connection with FIG. 5, controls the diving fins 13 in the desired manner. The vehicle 10 carries as its payload an explosive charge 21 which is released at point 24 from the vehicle under the control of a mine sensing device such as a gradiometer 22 when the vehicle 10 in executing its search pattern, shown in FIG. 3, about the acoustic marker 17 approaches a mine 23 within the destructive capability of the explosive charge 21. It is preferred to construct the vehicle 10 so that it has negative buoyance with its payload and positive buoyancy after its payload is released.

A control arrangement for accomplishing the search pattern illustrated in FIG. 3 is shown in FIG. 4. As here shown the respective outputs of the hydrophones 14 and 15 are processed through separate channels each including an amplifier 30 tuned to the frequency of the acoustic marker 17, a monostable multivibrator 31 for adjusting the pulse length, and an integrator 32 to provide a relatively smooth DC output to a comparator and servostabilizer 33 which provides an output having the polarity of the larger input from the hydrophones 14 and 15 and having a magnitude of their difference. The output from the comparator 33 is applied to a motor drive amplifier 34 which correspondingly powers a motor 35 to adjust through a gearbox 36 the set of the rudders 12. A source of right-rudder voltage posted on a terminal 39 is applied through a gate 37 and a lead 38 to the motor drive amplifier 34 whenever the gate 37 is open. The processed outputs from the hydrophones 14 and 15 are applied over leads 40 and 41, respectively, to the gate 37 in such manner that the presence of a signal on either of these leads 40 and 41 closes the gate 37, i.e., the rudder voltage on terminal 39 is in control at all times during which neither of the hydrophones 14 and 15 is receiving an acoustic signal of the proper frequency.

The diving, surfacing and height-above-the-bottom controlling apparatus diagrammatically illustrated in FIG. 5 comprises a pinging type sonic depth sounder 50 including a downwardly directed and preferably forwardly inclined transducer 51. The sounder 50 is adjusted in a known manner to provide a high voltage output whenever a bottom return signal is not received within a certain time interval and when the bottom return signal is received within this time interval, the output of the sounder 50 corresponds to the distance the transducer 51 is above the bottom. This distance-above-the-bottom signal from the sounder 50 is fed through a gate 52 to a servoamplifier 53 where it is compared with a voltage on a terminal 54 which has been preset to a value corresponding to the height above the ocean floor 18 it is desired for the vehicle 10 to swim through the water. The servoamplifier 53 correspondingly powers a servomotor 55 to adjust through a gearbox 56 the diving fins 13 carried on shafts 57 suitably housed in the vehicle 10. With this arrangement, upon placing the vehicle 10 in deep water with the height control voltage on terminal 54 preset to say 8 feet and with the depth sounder 50 operating, the output of the sounder 50 will exceed the preset voltage on terminal 54 and the diving fins 13 will cause the vehicle 10 to descend until it reaches a height of 8 feet above the ocean floor at which time the output of the sounder 50 will equal the voltage on terminal 54 and the vehicle 10 will thereafter continue to swim at a distance of substantially 8 feet above the bottom until the gate 52 is closed, as hereinafter described, at which time the preset voltage on terminal 54 predominates thereby adjusting the diving fins 13 to cause the vehicle 10 to ascend to the surface.

As shown in FIG. 5, the explosive 21, detachably mounted in the vehicle 10 in any well known manner, is adapted to be detached therefrom upon the energization of a suitable charge release mechanism 60 by the gradiometer 22. The release of the explosive 21 simultaneously (and preferably controlled by the physical detachment of the explosive 21) functions to close the gate 52 thereby causing the vehicle 10 to come to the surface.

The operation of the above described preferred embodiment of the invention will now be described in connection with FIG. 3. After the acoustic marker 17 has been placed in the vicinity of the mine 23 with the aid of any known mine detection device, the vehicle 10 having its hydrophones 14 and 15 and its amplifiers 30 tuned to the frequency of the marker 17, will upon being released in the water, descend under the control of the diving fins 13 until it reaches the selected height of 8 feet above the bottom and such descent will be in a spiral under the control of the rudder voltage on terminal 39 until at least one of the hydrophones 14 and 15 detects the acoustic marker 17, the resulting signal of which closes the gate 37 thereby placing the rudder 12 under the control of the comparator network 33. Thereafter, homing on the marker 17 continues with course being corrected so that the vehicle 10 heads directly for the marker 17 along a straight line of approach 61. When the vehicle 10 passes over the acoustic marker 17, the hydrophones 14 and 15 lose the signal whereupon the gate 37 opens and the rudder voltage on terminal 39 takes control of the rudder 12 to guide the vehicle 10 to starboard and along a circle 62 about a predetermined radius such as 25 feet. The vehicle 10 follows the circular path 62 until the signal from the acoustic marker 17 is again received by one of the homing hydrophones which will be hydrophone 14 in the assumed direction of travel. The homing system being again in control, the vehicle 10 will head toward the marker 17 along a substantially straight path 63 until it passes over the marker 17 at which time it again starts searching for the lost marker signal along another circular path 64 until it again picks up the marker 17. This repeated circling and straightening out will cause the vehicle 10 to progressively search the area within a 50 foot radius of the marker 17 until its short range detecting device 22, here shown as a gradiometer, detects the mine 23 and releases the explosive 21 at the point 24 after which the vehicle 10 spirals to the surface to be recovered. The dropped explosive will normally be set to explode after a desired time delay to permit the vehicle 10 and any other equipment to move out of the damage range of the explosion.

Although certain numerical values have been placed upon the search pattern above described, it will be understood that the radius of the circle to be searched about the marker 17 will be selected to correspond to the probable error in placement of the marker 17 and the angle $\theta$ at which a hydrophone picks up the marker signal will also be selected to obtain efficient coverage of the area. This latter selection may be made by varying the angle between the directivity patterns of the two hydrophones 14 and 15. Also it is to be understood that the distance at which the short range detector 22 detects a mine will be selected compatible with the destructive range of the explosive 21, destructive and detection ranges of not more than 10 feet being recommended.

It will be evident from the foregoing that the vehicle of the present invention will systematically search a bottom area centered about an acoustic marker and will deposit an explosive charge near any mine sensed in such area. It will also be evident that by utilizing markers differing in frequency of their emitted acoustic energy and vehicles uniquely responsive to the different marker frequencies, a vehicle will not be confused by the presence of more than one marker within its listening range.

While for the purpose of disclosing the invention a single embodiment has been described, it will be obvious to those skilled in this art that the novel features may be incorporated in a variety of embodiments without departing from the scope of the invention pointed out in the appended claims.

What is claimed is:

1. In a self-propelled elongated underwater vehicle having a rudder and diving fins adapted to execute a search pattern about an acoustic marker on the ocean floor and adapted to release an explosive charge carried thereby under the control of a mine sensing device, the combination of right and left bow hydrophones having substantially the same directivity patterns and located symmetrically with respect to the vertical plane defined by the longitudinal axis of said vehicle, an output circuit for each of said hydrophones, a servomechanism for adjusting the rudder, means for comparing the signals in said output circuits and correspondingly powering the rudder servomechanism, a gate circuit connected to be in closed condition only when a signal is present in either of said output circuits, a voltage source connected through said gate circuit to said servomechanism and operable to adjust said rudder to full rudder position in a direction corresponding to the polarity chosen for said voltage source, means for developing a control signal in accordance with the departure of the vehicle from a selected distance above the ocean floor, and means responsive to said control signal and adapted for operating said diving fins.

2. Apparatus for depositing with a probable error of one magnitude an explosive charge on the ocean floor near a ground mine the location of which has been marked with a probable error of the next order of magnitude by an acoustic transmitting device, comprising an automobile passive acoustic homing vehicle including diving control means operative when enabled to cause said vehicle to seek and maintain itself in equilibrium at a constant distance above the ocean floor and when disabled to cause said vehicle to rise to the surface, a steering system having a sensory aid for guiding said vehicle along a predetermined search pattern centered on said acoustic marking device, an explosive charge releasably attached to said vehicle, a mine detecting device, means controlled by said mine detecting device for releasing said charge, and means responsive to the release of said charge for disabling said diving control means.

3. The apparatus according to claim 2 wherein said vehicle is negatively buoyant when carrying said explosive charge and is positively buoyant after the release of said charge.

4. In a diving underwater vehicle adapted to home on and execute a search pattern centered on an acoustic marker on the ocean floor, diving control surfaces carried by said vehicle, a system for positioning said control surfaces to guide said vehicle to and along a path a fixed distance above the ocean floor, an explosive charge having a known radius of destruction, a sensory device adapted to develop a signal when said vehicle is over a circle centered on a mine and of a radius equal to said radius of destruction, and means responsive to said developed signal for releasing said charge and for positioning said control surfaces to guide said vehicle to the surface.

5. Apparatus for destroying a ground mine lying within a circle centered on a marker transmitting acoustic energy and of a selected radius comprising a dirigible underwater vehicle having a guidance system operative to steer the vehicle along a circular path having a diameter equal to said selected radius and to dive the vehicle to a fixed distance above the bottom, a passive homing system having an acute acquisition angle for preempting the steering of said vehicle during the time acoustic energy is being received from said marker, a mine detecting device, an explosive charge, and means controlled by the mine detecting device for releasing said charge.

* * * * *